(12) United States Patent
Sukkau et al.

(10) Patent No.: US 12,514,462 B2
(45) Date of Patent: Jan. 6, 2026

(54) MAGNETIC RESONANCE FACILITY OPERATION

(71) Applicant: Siemens Healthineers AG, Forchheim (DE)

(72) Inventors: Johann Sukkau, Herzogenaurach (DE); George William Ferguson, Erlangen (DE); Robert Rehner, Neunkirchen am Brand (DE); Jens Thöne, Lauf an der Pegnitz (DE); Julian Wohlers, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 140 days.

(21) Appl. No.: 18/519,142

(22) Filed: Nov. 27, 2023

(65) Prior Publication Data

US 2024/0172954 A1    May 30, 2024

(30) Foreign Application Priority Data

Nov. 29, 2022   (DE) ..................... 10 2022 212 805.2

(51) Int. Cl.
*G01R 33/24*       (2006.01)
*A61B 5/055*       (2006.01)
(Continued)

(52) U.S. Cl.
CPC .............. *A61B 5/055* (2013.01); *A61B 5/062* (2013.01); *G01R 33/243* (2013.01); *G01R 33/3415* (2013.01); *G01R 33/3875* (2013.01)

(58) Field of Classification Search
CPC ...... A61B 5/055; A61B 5/062; G01R 33/243; G01R 33/3415; G01R 33/3875; G01R 33/543; G01R 33/288
See application file for complete search history.

(56) References Cited

U.S. PATENT DOCUMENTS 10,799,119 B2    10/2020    Rinck et al.
2008/0211502 A1    9/2008    Arnold et al.
(Continued)

FOREIGN PATENT DOCUMENTS

| DE | 102008040003 A1 | 1/2009 | |
| DE | 102016203255 A1 | 8/2017 | |
| WO | WO-2021155955 A1 * | 8/2021 | ......... G01R 33/3875 |

*Primary Examiner* — Rishi R Patel
(74) *Attorney, Agent, or Firm* — Banner & Witcoff, Ltd.

(57) ABSTRACT

A computer-implemented method for operating an MR facility having a main magnet unit with a patient bore. A field of view (FOV) of the MR facility, defined by a main magnetic field's homogeneity, lies within the bore. A patient bench to position the patient within the patient bore is longitudinally movable. Additionally, a local coil arrangement with at least one coil element to measure MR data is freely positionable on the patient bench and/or a patient's body to be measured with respect to the longitudinal direction. The method includes: ascertaining position information of the local coil arrangement in the longitudinal direction using a measuring device when the patient bench is partially outside the patient bore; ascertaining recording information describing the local coil arrangement's position with respect to the FOV; and automatically positioning the patient bench in the longitudinal direction at an approach position ascertained from the position and recording information.

20 Claims, 6 Drawing Sheets

(51) Int. Cl.
*A61B 5/06* (2006.01)
*G01R 33/3415* (2006.01)
*G01R 33/3875* (2006.01)

(56) References Cited

U.S. PATENT DOCUMENTS

| | | |
|---|---|---|
| 2010/0052682 A1 | 3/2010 | Mueller |
| 2017/0248665 A1 | 8/2017 | Ludwig et al. |
| 2018/0003788 A1* | 1/2018 | Shinoda ............... G01R 33/543 |
| 2018/0116518 A1* | 5/2018 | Rinck ................ G01R 33/4808 |
| 2018/0164392 A1* | 6/2018 | George ................. A61B 5/055 |

* cited by examiner

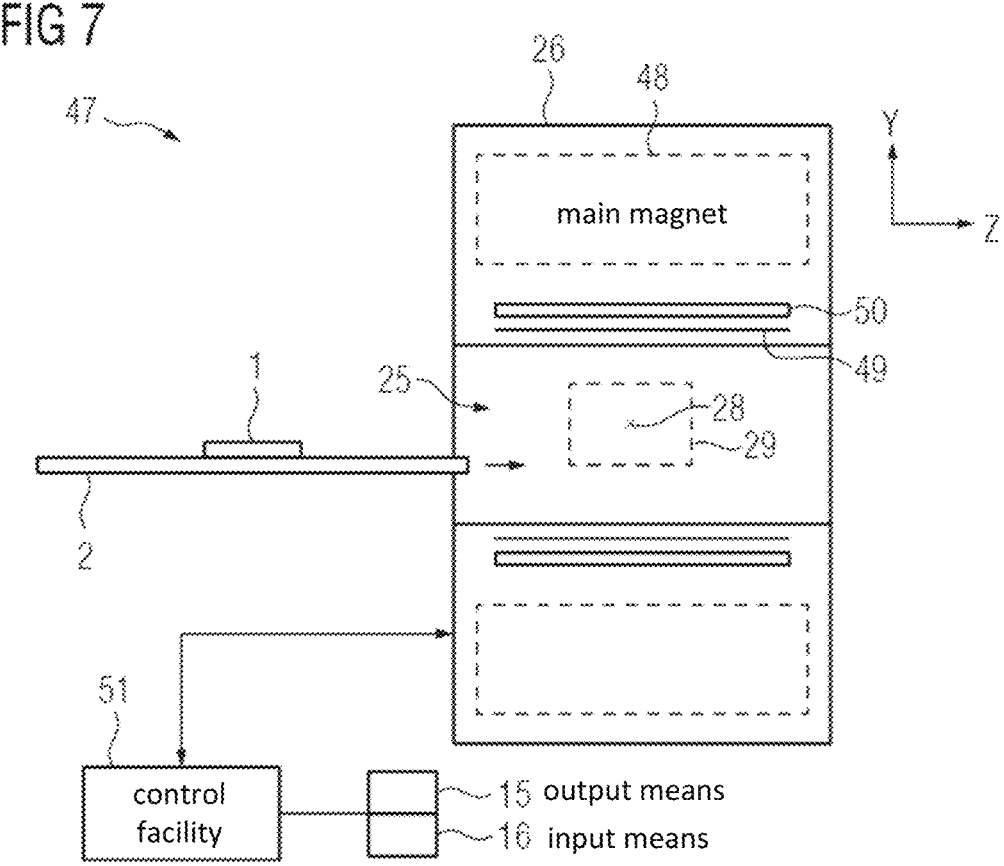
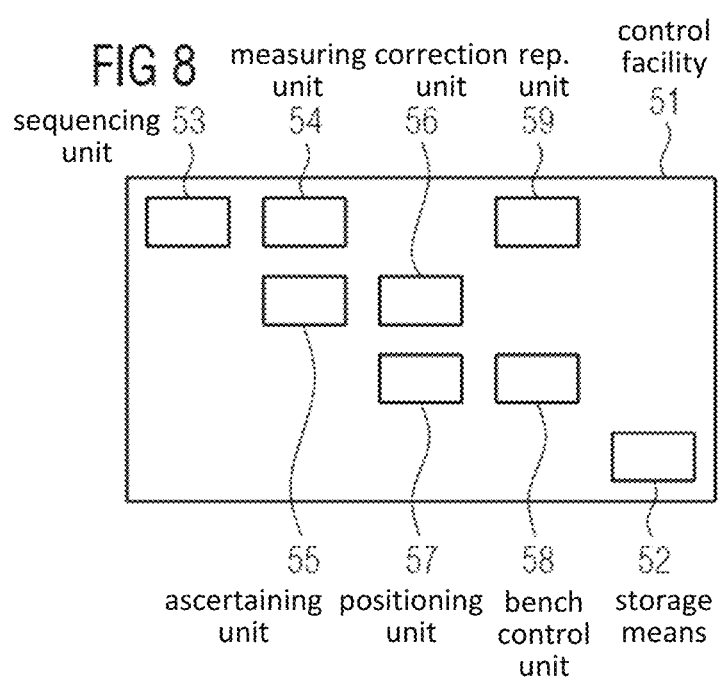

MAGNETIC RESONANCE FACILITY OPERATION

TECHNICAL FIELD

Irrespective of the grammatical gender of specific terms, terms also include individuals identifying as male, female, or another gender.

The disclosure relates to a computer-implemented method for operating a magnetic resonance facility having a main magnet unit with a patient bore, in particular, a cylindrical patient bore, wherein a field of view of the magnetic resonance facility, which is defined by the homogeneity of a main magnetic field generated by a main magnet of the main magnet unit, lies within the patient bore and a patient bench for positioning the patient in the patient bore can be moved along a longitudinal direction of the patient bench, which, in particular, corresponds to the longitudinal direction of the patient bore, wherein at least one local coil arrangement with at least one coil element for measuring magnetic resonance data is freely positionable on the patient bench and/or a patient to be measured at least with respect to the longitudinal direction. In addition, the disclosure relates to a magnetic resonance facility, a computer program, and an electronically readable data carrier.

BACKGROUND

Due to the wide range of possible uses, excellent image quality and wide variety of possible applications, magnetic resonance imaging is a frequently used modality in medical technology. However, this wide range of possible uses entails a high degree of complexity in the setting and selection of recording protocols and magnetic resonance sequences used for measuring magnetic resonance data. For this reason, the prior art already includes attempts to reduce the effort required to operate magnetic resonance facilities while still providing sufficiently good image quality of the magnetic resonance data.

One of the aids frequently used to achieve high image quality in magnetic resonance imaging is the use of so-called local coils. Local coils have the advantage that they can be placed extremely close to the region of interest in the patient, in contrast to, for example, body coils that surround a cylindrical patient bore. Here, it is possible to distinguish between permanently installed local coil arrangements comprising at least one local coil and freely positionable local coil arrangements. Herein, the first mentioned group of local coil arrangements comprises, for example, head coils that have a fixed installation position on a patient bench with which the patient is moved into the patient bore of the magnetic resonance facility or are even permanently installed. Another example is spinal coils, which can, for example, be integrated in the patient bench in the support region for the spine. Examples of freely positionable local coil arrangements include, for example, a plurality of coil blankets covering a plurality of anatomical regions or also other local coil arrangements that can be placed on the patient or patient bench.

When using local coils, it is important to position them skillfully with respect to the field of view of the magnetic resonance facility. The field of view of the magnetic resonance facility is usually defined by the homogeneity of the main magnetic field (B0 field). It can, for example, be formed by the so-called homogeneity volume. To achieve high quality measured magnetic resonance data, at least the coil elements of the local coil arrangement to be used for the measurement, in particular, reception, should ideally be placed in the field of view (FOV), in particular, in the center of the field of view (frequently also referred to as the isocenter in the case of magnetic resonance facilities).

In this regard, to simplify operation for fixed local coil arrangements, such as, for example, head coils, integrated spinal coils, and the like, operator support methods have been proposed that take advantage of the fact that the longitudinal position (position in the longitudinal direction) of the fixed local coil arrangements on the patient bench is known so that the patient bench can be selectively positioned such that the corresponding local coil is located in the field of view. In other words, for example, a local coil arrangement or a subcoil of the local coil arrangement having a fixed position on the patient bench can be selected, and the patient is positioned fully automatically using the patient bench in the field of view of the magnetic resonance facility in such a way that the local coil arrangement or subcoil, and hence the desired region of interest, are positioned in the field of view.

However, this is more problematic in the case of local coil arrangements that are non-fixed and freely positionable, at least in the longitudinal direction of the patient bench. Up to now, it has been provided that either manual time-consuming positioning of the patient bench by the user is required to ensure the local coil arrangement is positioned in the field of view or a patient model is used to determine the region of interest and hence suitable positioning of the patient bench.

Here, virtual patient models, which can be used to estimate the position of anatomical features and/or anatomical regions based on positioning information of the patient on the patient bench, can, for example, be ascertained statistically for a plurality of patients and can, for example, be adapted to the height and/or weight of the patient. Nevertheless, the use of a virtual patient model can lead to deviations. On the one hand, the positioning of the patient on the patient bench may be inaccurate, and on the other, the current individual patient may deviate from the assumed norm of the patient model. Herein, positioning the patient "feet first" usually presents greater problems than positioning the patient "head first" since the latter orientation requires the patient's head to be positioned in the head coil or on the head cushion of the patient bench for safety reasons. It is not mandatory to provide the use of a heel cushion for foot regions, wherein, in addition, knee cushions for positioning under the knees are frequently used, and this can modify the effective length of the patient.

Aids have already been proposed for manual positioning. For example, it is known to provide a laser marking facility at the entrance to the patient bore, wherein then, for example, the local coil arrangement, in particular, its center or the coil elements/the local coil to be used, can be positioned below the marking. Therefore, a position on the patient bench is known and can be used to achieve the most accurate possible positioning of the local coil arrangement or the coil elements in the field of view by moving the patient bench. For this purpose, the point to be marked must first be positioned correctly below the laser marking facility, the entry must be confirmed, and only then can the patient bench be moved automatically to its target position. On the one hand, this is somewhat complicated due to the manual entry, and, on the other, especially when setting for specific organs, the region of interest cannot necessarily be seen, so inaccuracies may occur. This can also apply to coil elements or subcoils of the local coil arrangement formed thereby. Alternatively, the target position can also be entered manually as numerical values.

SUMMARY

Therefore, the disclosure is based on an object of disclosing a comparatively improved possibility for assisting a user in positioning the patient bench in a patient bore when using a freely positionable local coil arrangement, which, due to automation, is, in particular, less complex and more precise.

With a computer-implemented method of the type mentioned in the introduction, it is provided according to the disclosure that the method has the following steps:

when the patient bench is at least partially located outside the patient bore and after positioning of the local coil arrangement, ascertaining position information describing the position of the local coil arrangement on the patient bench at least in the longitudinal direction with a measuring means, ascertaining recording information describing positioning of the local coil arrangement with respect to the field of view, and automatic positioning of the patient bench in the longitudinal direction at an approach position ascertained from the position information and the recording information.

Therefore, here, the automatic positioning, in particular, takes place in such a way that the local coil arrangement in the approach position, which can also be referred to as the target position, of the patient bench is arranged in a position relative to the field of view that is optimized for the measurement to be performed and/or for a localizer recording preceding the measurement. Herein, as is known in principle, the field of view can be defined by the homogeneity volume of the magnetic resonance facility, for example, as a region in which the homogeneity of the main magnetic field satisfies a certain limit value. In many cases, the field of view of the magnetic resonance facility corresponds to the center of the patient bore, particularly in the case of a cylindrical patient bore. It can be provided that the center point of the field of view corresponds to the center point of the patient bore. The center point of the field of view can also be referred to as the isocenter.

The local coil arrangement can provide a single local coil through its at least one coil element. However, it is also conceivable that the local coil arrangement comprises a plurality of subcoils, each formed by at least one coil element as individually usable local coils. For example, the local coil arrangement can be a type of "coil blanket" extending from the patient's knees to the patient's abdomen or chest. Such an extended local coil arrangement can then, for example, include subcoils for the knee, the hip region, the abdominal region and the like. For example, the prior art discloses so-called phased-array coils, which comprise a plurality of coil elements arranged in the manner of an array or a matrix, which can be combined or interconnected differently to form specific subcoils as local coils.

In a specific aspect, it can be provided that an approach context linking the position information and the recording information to the approach position, in particular, comprising a look-up table, is used to ascertain the approach position. Thus, for example, dependencies for supported workflows, recording protocols and/or magnetic resonance sequences, and/or local coil arrangements can be managed in a special approach context, particularly preferably a look-up table, which is stored in a permanent storage means of a control facility of the magnetic resonance facility that is also able to perform the method according to the disclosure. In addition to the position information and the recording information, it is preferably also possible for further information to be included in the ascertainment of the approach position. For example, the approach context can additionally use at least one item of coil information, the type of local coil arrangement and/or the division of the local coil arrangement into subcoils, as input information. Coil information can be retrieved from local coil arrangements that are, for example, connected directly via the plug-in connection at a coil plug-in location and/or using identification information that can, for example, be ascertained by the plug-in connection. Here, as is known in principle, it is possible, for example, to use pin codes and the like. Further expedient optional input data for the approach context can represent workflow information, for example, at least one recording protocol to be used and/or at least one magnetic resonance sequence to be used and/or a region of interest of the patient to be examined and/or a medical question and/or a recording objective. Furthermore, it is also optionally possible to include patient information, particularly patient arrangement information, in ascertaining the approach position, for example, age, height, gender, type of positioning, and the like. Such information can, in particular, be captured at least partially during the patient's registration.

According to the disclosure, it is proposed that a measuring means is used to automatically identify the position of the local coil arrangement on the patient bench, in particular, at least the longitudinal position. This enables further automation, which can at least partially complement the procedure for fixed local coil arrangements. One of these procedures is known by the name "Select & Go," in which a fixed local coil arrangement is selected directly or indirectly, and an approach position for the patient bench is derived directly therefrom, which, possibly after confirmation, can then be approached automatically by corresponding actuation of the actuator system of the patient bench using the control facility. When the missing knowledge, namely the arrangement of the local coil arrangement on the patient bench, has been added to the position information—which can be captured automatically with the measuring means—the recording information determined in particular, at least partially based on user input can additionally be used also to provide an analogous procedure, i.e., "Select & Go," for freely positionable non-fixed local coil arrangements with a corresponding gain in convenience. In particular, said approach context can introduce further information that is relevant in the case of non-fixed local coils.

A significant advantage of the present disclosure is the time saved in preparing the measurement. In particular, it is no longer necessary to move a patient bench manually under a laser marking facility and take a bearing on the local coil arrangement/anatomy since the magnetic resonance facility can independently ascertain the required approach position via the position information of the local coil arrangement provided via the measuring means. Fewer work steps are required, wherein, in particular, sources of errors in the workflow, for example, in the handling of the laser marking facility or inaccuracies in the body model, can also be reduced, and positioning of the patient can take place much more quickly.

Herein, the position information, which, based on the longitudinal position of the patient bench that is known in principle, also describes the positioning of the local coil arrangement relative to the patient bench, is expediently ascertained outside the patient bore, thus enabling sufficiently good access for the at least one measuring means or measurement without having to deal with the interaction with the fields used for magnetic resonance imaging. When the local coil arrangement has been placed on the patient or directly on the patient bench, the position information can be ascertained directly. The approach position is then derived therefrom as soon as the recording information is known.

Herein, a particularly advantageous aspect of the present disclosure provides that the measuring means used is a magnetic field strength sensor, in particular, a Hall sensor, installed in the local coil arrangement. Herein, it is also possible, in particular, for a plurality of Hall sensors, preferably three-dimensional Hall sensors, to be installed in the local coil arrangement. The sensor data from the at least one three-dimensional Hall sensor is used to ascertain position information as at least the coordinate in the longitudinal direction of the patient bench, which usually also corresponds to the longitudinal direction of the patient bore. Other magnetic field strength sensors are also conceivable in principle.

Herein, it should be generally noted that usually certain main directions, which can also correspond to physical gradient axes of the gradient coils of the gradient coil arrangement of the magnetic resonance facility, are used in magnetic resonance facilities with cylindrical patient bores. Here, the Z-direction is usually used as the aforementioned coincident longitudinal direction of the patient bench and patient bore. The Y-direction is the vertical direction perpendicular thereto, and the X-direction is the horizontal direction perpendicular thereto. This means that, for this commonly used coordinate system of the magnetic resonance facility, the longitudinal direction discussed here corresponds to the Z-direction.

The prior art has already proposed ascertaining position information for a local coil arrangement using a three-dimensional Hall sensor independently of the application discussed here. For example, DE 10 2016 203 255 A1 discloses a method and an apparatus for determining a position in a magnetic resonance imaging system, wherein a magnetic field strength sensor arranged in a fixed position relative to the local coil arrangement is used. After the main magnetic field of the magnetic resonance facility has been ultimately measured in this way, it is possible to use a corresponding main magnetic field map (B0 field map) to infer the position of the local coil arrangement from the sensor data from the Hall sensor. Herein, the aforementioned DE 10 2016 203 255 A1 also describes an optimal measuring point, i.e., a so-called "sweet spot," at which the dependence of the magnetic field strength of the main magnetic field on coordinates (X-direction and Y-direction) perpendicular to the longitudinal direction (Z-direction) is as low as possible. Such a "sweet spot" can also be advantageously used in the context of the present disclosure, as will be discussed in more detail below.

Herein, it should be noted at this point that since there is an at least a substantially homogeneous main magnetic field inside the patient bore and, in particular, in the field of view, this variant of position determination cannot be used there. However, due to the known longitudinal position and controllable movability of the patient bench, measurement with the magnetic field strength sensor outside the patient bore, where there is a spatially highly variable main magnetic field, nevertheless enables a point with a known position relative to the position of the local coil arrangement, in particular, the local coil arrangement itself, to be specifically brought into the field of view of the magnetic resonance facility.

Preferably, in addition to the at least one magnetic field strength sensor, in particular, the Hall sensor, an inclination sensor can also be installed in the local coil arrangement as a measuring means. An inclination sensor of this kind, in particular, enables an orientation of the local coil arrangement to be ascertained, for example, with respect to the Earth's gravity, so that, despite symmetries of the main magnetic field, the pose, i.e., the position comprising the orientation, can be identified in all six degrees of freedom, i.e., in the three spatial degrees of freedom (in particular X, Y, Z) and in the three orientation degrees of freedom (in particular yaw, pitch and roll angles). Therefore, it is also then possible to determine a six-dimensional pose as position information.

Herein, it should also be noted at this point that, in particular, in the case of local coil arrangements exhibiting asymmetry, for example, with respect to the coil elements, it is expediently possible to determine a yaw angle of the local coil arrangement, in particular, directly from the sensor data from the Hall sensor. This yaw angle describes the alignment of the local coil arrangement in the horizontal plane, thus, for example, enabling it to be identified whether the length of an elongated local coil arrangement extends in the Z-direction (longitudinal direction) or in the transverse direction (X-direction), wherein intermediate orientations are obviously also conceivable. This particularly advantageously enables the individual coil elements of the local coil arrangement to be localized, which can also influence the selection of the approach position and, hence, the implementation of the recording information. However, it is true for both the determination of a six-dimensional pose and for the yaw angle itself that knowledge thereof can bring highly relevant benefits in the further course, in particular, with respect to the measurement, as will be explained in more detail below.

To ascertain the position information, a position of the magnetic field strength sensor, in particular, the Hall sensor, that was ascertained from its sensor data, can be corrected by a displacement of the magnetic field strength sensor from a coordinate origin of a local coil coordinate system of the local coil arrangement, in particular, using orientation information ascertained using the at least one measuring means, for example, using the magnetic field strength sensor and/or the inclination sensor, which describes the orientation of the local coil arrangement, at least in the horizontal plane. Obviously, in this context, if it forms part of the position information, the orientation can likewise be corrected based on the known orientation of the magnetic field strength sensor relative to the local coil arrangement, in particular, the local coil coordinate system thereof. Hence, the position information then specifically describes the position of the coordinate origin of the local coil coordinate system. Hall sensor For many local coil arrangements, such as a local coil coordinate system, the coordinates of which are frequently denoted by (U, V) in the plane in which the coil elements extend, is in principle known, and it is, therefore, advisable to use its coordinate origin as the location to which the position information refers. In particular, it is also generally possible for the coordinate origin of the local coil coordinate system to be selected in the center of the local coil arrangement.

Since, due to its design, the magnetic field strength sensor, in particular, the Hall sensor, is not generally located in the center of the local coil arrangement, its position, i.e., the position of the coordinate origin, can be calculated with the aid of the known displacement between the coordinate origin and the magnetic field strength sensor. The control facility performing the method may know the corresponding information, for example, based on the aforementioned coil information. Herein, a local coil arrangement can, for example, be identified by plugging it into a slot in the patient bench so that corresponding coil information allowing coil identification is provided. In a storage means of the control facility, the coil information or identification information can be assigned a coil file containing further essential information about the local coil arrangement. Alternatively, the control facility can also retrieve such a coil file, for example, from a server. The coil file can, for example, store the place where the at least one magnetic field strength sensor and/or the at least one coil element are located in the coordinates of the local coil coordinate system (U, V).

Alternatively, or in addition to the preferred aspect with a magnetic field strength sensor installed in the local coil arrangement, it is also possible to use other measuring means within the scope of the present disclosure. For example, it can be provided that a 3D camera is used as the measuring means. Such 3D cameras, for example, terahertz cameras, for measuring outside the patient bore and partially inside the patient bore have already been proposed in the prior art and can also be used within the scope of the present disclosure, wherein, in such a case, more complex data processing may be necessary.

A fundamental concept of the present disclosure is that the targeted placement of the local coil arrangement and the corresponding skill of the user performing the placement provide clear indications of where measurements should be taken. If the position information of the placed local coil arrangement is measured, this indication is also available in the control facility of the magnetic resonance facility and can hence be used to derive an approach position for the patient bench and for this to be approached automatically. In other words, it is even conceivable to infer or even preset the recording information or proposals, therefor, automatically from the available information.

Generally, it can be said that the recording information describes the positioning of the local coil arrangement with respect to the field of view directly or indirectly, in particular, by notifying a position of the patient on the patient bench and/or patient arrangement information describing the local coil arrangement. There are a number of possibilities for this.

In a particularly preferable aspect of the present disclosure, it can be provided that the recording information is ascertained at least partially describing the positioning of the local coil arrangement center and/or the coordinate origin of the local coil coordinate system and/or one of the at least one coil element, for example, a subcoil, with respect to the field of view, in particular, in the center of the field of view. Herein, as already mentioned, the local coil arrangement center can correspond to the coordinate origin of the local coil coordinate system. However, the recording information can also relate to, if present, one of the subcoils of the local coil arrangement or even to a specific single coil element. This preferred specification of recording information is based on the assumption that an experienced user will position a local coil arrangement optimally for the intended measurement, i.e., in particular, in such a way that the desired region of interest of the patient in the field of view can be recorded with the local coil arrangement in the field of view. In other words, it can be assumed that the local coil center of the local coil to be used is placed coincident with the intended center of the field of view (center point of the field of view). If the local coil arrangement is to be used as a whole, the local coil center relates to the center of the local coil arrangement, in particular, the coordinate origin of the local coil coordinate system of the local coil arrangement. In the case of subcoils, the local coil center then relates to the corresponding subcoil as a local coil. Therefore, this can then result in corresponding displacements or offsets with respect to the longitudinal position of the local coil arrangement contained in the position information with regard to its usefulness for ascertaining the approach position.

While, therefore, in a simple case, it can be assumed that the local coil arrangement center or local coil center moves to the center point of the field of view to ascertain the approach position, which represents an intuitive, easy-to-implement case, in the case of certain workflows or measurements or generally recording situations, cases may occur in which other displacements are also to be taken into account, for example, when a local coil arrangement cannot be positioned accurately so that its center coincides with the center of the field of view for the measurement to be made. Here, corresponding longitudinal displacements can preferably be ascertained automatically by the approach context. In other words, for ascertaining the approach position, it can, in principle, be assumed that the local coil arrangement center is to be placed in the center of the field of view, thus resulting in a basic value for a displacement distance of the patient bench. The approach context now determines a longitudinal displacement to be applied to this basic value—in the simplest case, this is zero.

More generally, therefore, it can be provided that the approach position is described using a basic value that describes the longitudinal distance of the local coil arrangement to the center of the field of view based on the position information and is modified by a longitudinal displacement. The longitudinal displacement can be zero.

In a specific aspect, it can be provided that, when using a plurality of local coil arrangements arranged adjacent to one another on the patient in a non-overlapping manner, if one of the local coil arrangements is intended to be used, a longitudinal displacement to be applied for the approach position, by which, due to the additional arrangement of the further local coil arrangement, the one local coil arrangement is displaced in the longitudinal direction from an ideal position for the measurement, is ascertained in dependence on coil information provided describing the local coil information using a displacement context, in particular, forming part of the approach context. For example, in a specific example, two local coil arrangements can be used: an abdomen local coil arrangement and a chest local coil arrangement. The abdomen local coil arrangement is placed over the abdomen; the chest local coil arrangement is placed over the patient's rib cage. If the position information for both local coil arrangements is known based on the measuring means and a measurement is now to be made on the heart first, it can be identified that the chest local coil arrangement provided for the heart measurement could not be placed directly over the heart, since it would otherwise have to be placed overlapping with the abdomen local coil arrangement. In such a case, a longitudinal displacement of +5 cm, for example, can be specified by the displacement context. However, a variety of other specific examples in which such a displacement is advisable are also conceivable.

In this context, it is incidentally particularly expedient if the displacement context is already integrated into the approach context. In the example, the additional information that the heart is to be recorded first can then be transferred as workflow information from which the corresponding conclusions can be drawn automatically if two local coil arrangements of the corresponding type are present. For example, such cases can be covered in a look-up table as an approach context.

However, even independently of an integrative aspect with the approach context, it is also particularly expediently conceivable for such displacement contexts to be provided as a trained artificial intelligence displacement function, i.e., to determine them by machine learning. This can obviously also be advantageously applied overall to an approach context in which the at least one displacement context is integrated so that, instead of or in addition to a look-up table, this can, for example, also contain a trained artificial intelligence approach function.

In addition to a direct reference to the local coil arrangement or a subcoil/coil element, as already mentioned, the recording information can also indirectly establish the reference to the local coil arrangement. For example, it can be provided that, at least partially, the positioning of an anatomical feature and/or an anatomical region, in particular, of its center, derived, in particular, from an already known portion of the recording information, is ascertained descriptively as the recording information. In other words, therefore, it can also be provided that the center of a body region, for example, the abdomen, or the center of an anatomical feature, for example, an organ, such as the heart, kidney, or lung, is placed in the center of the field of view. It is then possible to derive the positioning of the local coil arrangement from patient arrangement information with respect to the patient bench (and its known longitudinal position) since the position of the anatomical feature and/or the anatomical region relative to the local coil arrangement can be derived. In some cases, the aforementioned patient arrangement information can also be ascertained with one measuring means or the measuring means, for example, in the case of a 3D camera, wherein, however, it is preferable, for example, in the case of the magnetic field strength sensor as the measuring means, to derive or estimate the patient arrangement information in as simple a manner as possible.

For example, to ascertain the patient arrangement information, it can be provided that patient information from registration is evaluated. In addition to name and age, patient information recorded during registration can, for example, also comprise height, weight, and position, for example, "head first prone." This now takes advantage of the fact that patient benches frequently provide aids for the correct positioning of the patient, for example, target positions for the head and/or the feet/heels. For example, positioning on a pillow or in a head coil can be specified for the head. Corresponding reference positions can be specified at the foot end for "feet first" positions. Together with the height and weight of the patient, this gives a good estimate of where and how the patient is positioned on the patient bench. Therefore, it is also possible to estimate the position of certain anatomical features and/or anatomical regions with a high degree of quality.

Ascertaining patient arrangement information with respect to the patient bench is also expedient in other respects within the scope of the present disclosure, for example, if the recording information is to be at least partially determined based on user input.

For example, an advantageous development of the disclosure provides that patient arrangement information with respect to the patient bench is ascertained or provided, wherein a representation, in particular, a schematic representation, of the relative positioning of the patient and the local coil arrangement and/or at least one coil element, in particular, the subcoils, of the local coil arrangement is generated from the patient arrangement information and the position information and is output on an output means, wherein the recording information is at least partially ascertained from user input related to the representation. In particular, therefore, a representation with the patient and the local coil arrangement, in particular, against the background of the patient bench, can be generated, which, with particular advantage, can permit a complete definition of the recording information via a single operator action or, in the case of a confirmation, two operator actions. The user input also generally relates to the representation and can, for example, relate to the selection of the local coil arrangement center, the center of at least one coil element, in particular, a subcoil, the center of an anatomical region and/or the center of an anatomical feature. The correspondingly selected point in the user input can then be the one to be placed in the center of the field of view according to the recording information. Therefore, the selection allows longitudinal displacement to be ascertained based on the longitudinal position of the local coil arrangement according to the position information and to be taken into account during the determination of the approach position. If, for example, the local coil arrangement center is selected by user input, the longitudinal displacement is zero since the local coil arrangement center, which is expediently indicated via the longitudinal position, is to be moved into the center of the field of view. For subcoils, for example, longitudinal displacement with respect to the local coil arrangement center results directly from the coil information already discussed. As far as the selection of the center of an anatomical region and/or anatomical feature is concerned, back calculation is, in principle, conceivable if the respective longitudinal positions on the patient bench are known, wherein, in particular, as described above, a good estimation would then have to be assumed with respect to the patient arrangement information.

However, particularly advantageously, in the case of user input relating to an anatomical region and/or an anatomical feature, for example, an organ, such as the heart, kidney, or lung, it is also possible first to assume correct placement of the local coil arrangement and to derive a longitudinal displacement, as already discussed generally above with respect to the recording information and the displacement context, for example, from empirical values or the like. An example of this, heart recording when using two adjacent local coil arrangements, has been discussed above. Herein, it should be noted again that the dependencies of the longitudinal displacement for all supported workflows and local coil arrangements can also be managed integratively in the approach context, for example, in a special look-up table.

In principle, different variants are conceivable for the representation, for example, comprising a selectable map of the local coil arrangement and/or the subcoils thereof in relation to the patient, in particular, taking into account the patient's height, or as a selectable body region in relation to the patient, selected based on position information and, in particular, also on coil information for the local coil arrangement.

In general terms, it can be provided that the representation comprises at least one current proposal for the recording information, and the user input relates to a confirmation or rejection of at least one of the at least one proposal. According to the above, it can preferably be provided that at least one of the at least one proposal is ascertained describing the positioning of the local coil arrangement center and/or the coordinate origin of the local coil coordinate system and/or at least one of the at least one coil element in the field of view, in particular, the center of the field of view. For example, in the case of a plurality of subcoils, the local coil center of each of these subcoils can be represented as a proposal. In the case of a plurality of local coil arrangements, these can also be represented accordingly as a proposal and be confirmable. In this context, it is also conceivable that at least one of the at least one proposal descriptively ascertains positioning of an anatomical feature and/or an anatomical region, in particular, the center thereof, in particular, derived from an already known portion of the recording information, in the center of the field of view. After confirmation of a proposal, this can become recording information.

An input means can be used for user input. In a particularly advantageous aspect of the present disclosure, the input means can be integrated with the output means. Herein, it can, in particular, be provided that a touchscreen, in particular, provided on a front side of the main magnet unit, is used as output means, wherein the user input is ascertained comprising user interaction with the representation on the touchscreen. For example, a schematic representation of the at least one local coil arrangement or the subcoils thereof, in particular, superimposed as true-to-location as possible on a map of the patient based on the patient arrangement information, can then be generated as a representation, wherein, for example, tapping the local coil arrangement as a whole then enables the user input to describe an arrangement of the local coil arrangement center or the coordinate origin of the local coil coordinate system in the center of the field of view and correspondingly for the subcoils. As described above, interaction with anatomical regions and/or anatomical features is also conceivable in principle. This enables the recording information to be defined in a particularly intuitive and simple way, with the definition then describing what is to be arranged in the center of the field of view and, hence also, the position of the center of the field of view relative to the local coil arrangement. As already explained, here once again, reference to the local coil arrangement or its coil elements/subcoils is particularly preferably preferred, assuming that the local coil arrangement is positioned such that the desired measurement can also take place.

In this way, a type of "Select & Go" is ultimately also implemented since, in particular, in a single operating step, possibly provided with a confirmation, it is possible to select what is to be placed in the center of the field of view, preferably the local coil arrangement as a whole and/or one of a plurality of subcoils provided thereby. When the position information provides the longitudinal position of the local coil arrangement, if the longitudinal displacement relative to the local coil arrangement can be ascertained, it is easy to determine a corresponding approach position and use it for automatic positioning of the patient bench.

In a particularly preferable development of the method according to the disclosure, it can be provided that when a Hall sensor is used as a measuring means for more precise positioning at the approach position using the Hall sensor, a previously known optimal measuring point in the longitudinal direction, in which the sensor data from the Hall sensor is at least dependent on the position of the Hall sensor perpendicular to the longitudinal direction, is localized using the Hall sensor while the patient bench is being moved into the patient bore, and the result of the localization is used to correct the position information and/or approach position. As also discussed in DE 10 2016 203 255 A1, such an optimal measuring point can also be referred to as a "sweet spot." Therefore, if X, Y, and Z are used as the main directions, wherein the longitudinal direction corresponds to the Z-direction, it can be said that the optimal measuring point is the Z-position at which the least deviation from the main magnetic field measured as sensor data results for different X- and Y-positions. However, this also means that at this optimal measuring point, i.e., the "sweet spot," there is the highest accuracy for determining the Z-coordinates. This accuracy can be higher than that determined at the Z-coordinate of the position information. If this can be related to a corresponding longitudinal position of the patient bench, a corresponding correction of the longitudinal position of the local coil arrangement or the approach position derived therefrom is obviously possible. In other words, in this aspect, the more accurate determination of the position of the local coil arrangement in the longitudinal direction (Z-direction) is based on the fact that when the patient bench with the local coil arrangement is moved into the patient bore, the optimal measuring point, i.e., the "sweet spot," is passed where highly accurate determination of the coordinate in the longitudinal direction, for example, less than 3 mm, is possible. In a previous position outside the patient bore, this accuracy can be significantly lower, for example, in the range of 3 cm.

If there is a high-speed data link, for example, provided using an optical fiber, in the magnetic resonance facility between the Hall sensor and the control facility performing the method and, if the position of the patient bench in the longitudinal direction is also available at least substantially in real time, a direct comparison is possible: the longitudinal position of the patient bench at the time of the passing through the optimal measuring point is known directly, so that, with the known longitudinal position of the optimal measuring point, knowledge of the longitudinal position of the patient bench also at the time of recording of the position information and the position of the patient bench at the time of passing through the optimal measuring point, comparable positions of the local coil arrangement or the Hall sensor on the patient bench result, of which the higher reliability of the more recent is known so that the error can be inferred and corrected accordingly.

However, in many known magnetic resonance facilities to which the method according to the disclosure is intended to be applicable, there is a slower communication link between the local coil arrangement and hence the Hall sensor and the control facility, for example, an I2C bus. In such an aspect, it is proposed that synchronization between the position of the patient bench in the longitudinal direction and passage through the optimal measuring point (measured position of the local coil arrangement in the longitudinal direction) be established over time.

Herein, an expedient aspect of the present disclosure provides that, to localize the measuring point when the patient bench starts moving, the Hall sensor is switched to a localization mode in which, for each of a plurality of time steps, the main magnetic field is measured and compared with a prespecified threshold value for the main magnetic field at the optimal measuring point, wherein the threshold value time is stored, in particular, as a time step number since activation at which the threshold value is exceeded, wherein, at the end of the movement of the patient bench, the localization mode is terminated and the total time of the localization mode is stored, in particular, as a number of time steps, wherein the result of the localization is ascertained from the threshold value time and the total time. Herein, in the present considerations, it is assumed that, as usual, the patient bench is moved at a constant speed. At the start of the movement of the patient bench, the three-dimensional Hall sensor is switched to the localization mode, which can also be referred to as the "sweet-spot search mode." When the patient bench stops, this localization mode is deactivated accordingly. In the localization mode, the three-dimensional Hall sensor, in particular, does not transmit any data but measures the main magnetic field and compares it with a threshold value corresponding to the measured value of the main magnetic field strength at the optimal measuring point. This threshold value depends on the specific aspect of the magnetic resonance facility, in particular, also the field strength of the main magnetic field, and can, for example, be ascertained by simulations or measurements. When the threshold value has been found with sufficient accuracy, the corresponding time and, in particular, the corresponding sensor data are stored in the three-dimensional Hall sensor, in particular, in a storage means of a microcontroller of the Hall sensor, together with the number of time steps that have elapsed, which then can, for example, be microcontroller ticks. Since, using the difference, i.e., the total time of the localization mode, also the start time and the end time of the localization mode are stored, it is now, in particular, possible to form a ratio as time steps to the optimal measuring point (i.e., threshold value time minus start time) by the total time (likewise in time steps), wherein this ratio can be transmitted to the control facility on conclusion of the localization mode. This now, in turn, makes it possible to identify on the control facility which bench position was present with a corresponding ratio multiplied by the total time measured there.

Here, it can be specifically provided that a control facility of the magnetic resonance facility that actuates the Hall sensor and the patient bench likewise measures a total time of movement of the patient bench and the start position and end position of the patient bench, wherein, after completion of the movement, a threshold value position of the patient bench assigned to the threshold value time is ascertained from the Hall sensor's total time, the threshold value time, the control facility's total time and the start and end position, and, together with a threshold value position of the Hall sensor, in particular, measured by the Hall sensor and/or assumed to be the longitudinal position of the measuring point, is used to correct the position of the local coil arrangement on the patient bench and to derive the position information and/or approach position therefrom. However, in one variant, it is also possible that, during the movement of the patient bench into the patient bore, the bench position is logged regularly, for example, 30 times a second, so that a longitudinal position profile of the patient bench is available in the control facility from which, when the ratio of the threshold time and the corresponding total times are known, the threshold value position of the patient bench assigned to the threshold time can also be easily ascertained. In all these cases, even if a comparison in real time is not possible, in each case, a position of the local coil arrangement or the Hall sensor on the bench can be identified, once at a position with higher measuring accuracy and once at a longitudinal position with lower measuring accuracy, so that the value at the measuring position with higher measuring accuracy can be used for the correction or generally for approaching the approach position more accurately. For example, the difference between these positions of the local coil arrangement relative to the patient bench can be understood as a correction value to be applied to the approach position as well (and possibly also the position information). However, it is also possible to directly update the approach position with the current position information about the "sweet spot." If, for example, a longitudinal displacement relative to the basic value (displacement distance of the local coil arrangement center in the center of the field of view) is determined by the approach context, this can be easily applied to the current accurately determined displacement distance.

To enable a further increase in accuracy, it can also be provided that a threshold value position of the Hall sensor assigned to the threshold value time is ascertained, in particular, by interpolation with a discretely known main magnetic field profile and/or between time steps. In a rougher approximation, the threshold value time can also be assigned the (previously known) longitudinal position of the optimal measuring point as the threshold value position of the Hall sensor, or the threshold value time can be corrected by interpolation between at least one main magnetic field strength measurement before the threshold value is exceeded and at least one main magnetic field strength measurement after the threshold value is exceeded for a more accurate description of the optimal measuring point. However, the preferred variant is the one in which the actual distance of the measured optimal measuring point to the center of the field of view, which is usually used as a reference, is ascertained from the magnitude of the flux density at the optimal measuring point.

Regardless of whether such a proposed correction is made with the aid of an optimal measuring point, the patient bench stops at the corresponding approach position, and the measurement of the magnetic resonance data can commence. To perform the measurement or during the performance of the measurement, in an advantageous development of the method according to the disclosure, the position information can also be advantageously used in other ways.

As already mentioned, it can be provided that the measuring means ascertains the complete three-dimensional position and/or the complete three-dimensional orientation of the local coil arrangement, in particular, the complete six-dimensional pose of the local coil arrangement, as position information, in particular, when a Hall sensor and an inclination sensor are installed in the local coil arrangement. Herein, as already mentioned, at least parts of the position information, in particular, all the position information, is measured before entry into the patient bore, in the case of the Hall sensor, for example, since this would not be able to identify any more sufficient differences in the homogeneity volume. Nevertheless, the position information measured outside the patient bore can always be used as the basis for deriving a current longitudinal position of the local coil arrangement by using the change in the longitudinal position of the patient bench for updating. Corresponding position feedback from the patient bench is usually available in the control facility of the magnetic resonance facility anyway. It is, therefore, also known at the approach position where the local coil arrangement, in particular, the coordinate origin of the local coil coordinate system, is currently located and/or what the orientation of the local coil arrangement is.

Such a further determination of the position information can, in particular, also initially additionally allow workflow information describing the measurement of the magnetic resonance data more accurately to be determined automatically. Thus, it can be provided that the position information is evaluated for the automatic ascertainment of at least one item of workflow information, in particular, a region of interest to be recorded and/or laterality. User input is then no longer required for this workflow information, and this further simplifies and accelerates operation. Herein, it can, in turn, be assumed that the operator positions the local coil arrangement suitably for the recording. For example, in conventional approaches, with organs or anatomical features that are found on both sides of the patient, it is often necessary for laterality to be specified, i.e., whether recordings are to be taken of the left side or right side or even both sides. For example, when taking a recording of the hip, it is possible to choose whether recordings are to be taken of the left hip, right hip, or both hips. However, ascertaining the position information now also allows laterality to be determined automatically so that, for example, only the user's confirmation needs to be requested. If, for example, the local coil arrangement (or a subcoil to be used) has been placed closer to one side of the patient, it can be inferred that measurements should be taken there. A similar approach can also be taken for other types of workflow information.

Based on complete position determination and possibly orientation determination, it can expediently be provided that, to record a localizer at the start of the measurement, the center point of the localizer is placed on the current local coil arrangement center or, in dependence on off-center information relating to the subsequent measurement of the magnetic resonance data that describes a distance of a region of interest of the patient from the center of the field of view, an offset for the center point of the localizer from the local coil arrangement center in at least one spatial direction is ascertained using an offset context. A localizer that is usually recorded at the beginning of a measurement on a patient can, for example, comprise three orthogonal slices, wherein the center point of the localizer is then, in particular, defined by their point of intersection. As already mentioned, moreover, the local coil arrangement center, in particular, corresponds to the coordinate origin of the local coil coordinate system and/or, in any way, to the specific three-dimensional spatial position of the local coil arrangement. For examinations in the center of the field of view, it is desirable for the center point of the localizer also to be located in this center of the field of view. However, there are also so-called off-center measurements, for example, when examining shoulders or knees, for which it may be desirable to place the center point of the localizer elsewhere so that until now, a user had to intervene manually in the settings of the localizer and this took time.

In the present case, however, advantage can be taken of the fact that information is available about further, in particular, all six, degrees of freedom of the local coil pose (in particular, X-coordinate, Y-coordinate, Z-coordinate, yaw angle, roll angle, and pitch angle). Then, the position of the localizer can be changed automatically so that manual correction is not necessary and the measurement is accelerated. In the simplest case, the center point of the localizer can be allocated the current three-dimensional position of the local coil arrangement when it is placed in the center of the field of view. However, if the approach position was determined such that the current position of the local coil arrangement is outside the center of the field of view, the corresponding longitudinal displacements are known, so that the center point of the localizer can also be easily placed in the center of the field of view.

However, more complicated cases are also conceivable in which only some of the coordinates are taken over or even offsets are provided for all three spatial coordinates. For example, when examining shoulders and/or knees, it is advisable to provide a corresponding offset for the corresponding shoulder or the corresponding knee in the horizontal direction perpendicular to the longitudinal direction, i.e., the X-direction. Generally, depending on the workflow, in particular depending on a recording protocol, offsets can be estimated that automatically move the center point of the localizer out of the center of the field of view. Such specifics of a current workflow, in particular, a recording protocol, describe the offset information, from which, in this exemplary aspect, an offset context can be used to ascertain an offset for the center point of the localizer in at least one spatial direction, in particular, relative to the local coil arrangement center, but possibly relative to the center of the field of view, whose position relative to the local coil arrangement center in the approach position is known. Herein, the offset context can, for example, be based on empirical values, wherein it also applies to the offset context that it can be stored integratively as part of the approach context. In particular, the offset context can comprise a trained artificial intelligence offset function that has been trained using machine learning. To summarize, in this aspect, optimal positioning of the localizer can be performed in an automated manner.

In another advantageous use of further position information, here, in particular, the six-dimensional pose, it can be provided that the six-dimensional pose of the local coil arrangement is used to select coil elements to be used during the measurement, wherein non-overlapping coil elements lying in the field of view and/or in the physical gradient axes and/or logical gradient axes of the magnetic resonance facility are selected for the measurement. In other words, in this aspect, the position information about the three spatial coordinates and the orientation, in particular, pitch angle, yaw angle, and roll angle, are used to automatically select the coil elements of the local coil arrangement to be used for the measurement, in particular, the coil elements to be used to receive magnetic resonance signals. However, in this respect, it has already been proposed in the prior art that when a position of the local coil arrangement in the longitudinal direction is known, coil elements selected for reception should be those whose longitudinal direction coordinate lies in the field of view, cf. in this regard US 2008/0211502 A1, for example. With the information in the other two spatial directions and for orientation, receiving elements can also be selected and/or deselected (deactivated) depending on their further spatial coordinates, for example, on the X-coordinate and/or the Y-coordinate. Deselection is, in particular, advisable if coil elements of the local coil arrangement overlap, for example, in the horizontal transverse direction (X-direction), which would result in poorer image quality due to coupling. The six-dimensional pose in the position information, in particular, together with the aforementioned coil information, enables this problem to be solved automatically by deselecting and deactivating problematic coil elements, thus enabling improved image quality to be achieved.

Herein, it should also be noted in this context that the aspects just mentioned for using position information relating to at least three orthogonal spatial axes, in particular, together with orientation information, can be advantageously used in localizer positioning and the selection of coil elements, in particular, for reception, including independently of the main subject matter of this disclosure described in claim 1: ascertaining and automatically approaching the approach position.

In addition to the method, the disclosure also relates to a magnetic resonance facility having a control facility and a main magnet unit with a patient bore, in particular, a cylindrical patient bore, wherein a field of view of the magnetic resonance facility, which is defined by the homogeneity of a main magnetic field generated by a main magnet of the main magnet unit, lies within the patient bore, and wherein a patient bench for positioning the patient in the patient bore can be moved along a longitudinal direction of the patient bench, wherein the magnetic resonance facility further has at least one local coil arrangement with at least one coil element for measuring magnetic resonance data, which is freely positionable on the patient bench and/or a patient to be measured at least with respect to the longitudinal direction, and a measuring means for capturing the position of the local coil arrangement positioned for the measurement at least in the longitudinal direction, wherein the control facility comprises:
a measuring unit for ascertaining position information of the local coil arrangement with the measuring means when the patient bench is at least partially located outside the patient bore,
an ascertaining unit for ascertaining recording information describing positioning of the local coil arrangement with respect to the field of view, and
a positioning unit for automatic positioning of the patient bench in the longitudinal direction at an approach position ascertained from the position information and the recording information.

All statements with respect to the method according to the disclosure can be transferred analogously to the magnetic resonance facility according to the disclosure with which, therefore, the aforementioned advantages can likewise be obtained. Herein, particularly preferably, the measuring means comprises a magnetic field strength sensor installed in the local coil arrangement sensor and/or an inclination sensor installed in the local coil arrangement, in particular, provided in addition to the magnetic field strength sensor.

The control facility is configured to perform the method according to the disclosure and can, in particular, have at least one processor and at least one storage means. Hardware and/or software are used to implement functional units in the control facility, which, in addition to the measuring unit, the ascertaining unit, and the positioning unit, can also comprise further functional units. For example, a sequencing unit that is known in principle can be used to perform the measurement, in particular, to record the localizer of the magnetic resonance data. A representation unit can be used, as described, to generate and output a representation for which purpose the magnetic resonance facility can comprise an output means.

The magnetic resonance facility can further also have an input means for receiving user input. The output means and the input means can, with particular advantage, be combined as a touchscreen. Further conceivable functional units of the control facility comprise a correction unit, in particular, for correction using the optimal measuring point, wherein the sequencing unit can be correspondingly embodied with regard to the described localizer positioning and/or coil element selection.

A computer program can be directly loaded into a storage means of a control facility of a magnetic resonance facility and has program means for performing the steps of a method according to the disclosure when the computer program is executed on the control facility of the magnetic resonance facility. The computer program can be stored on an electronically readable data carrier according to the present disclosure, which therefore comprises control information comprising at least one computer program according to the disclosure and is embodied such that when the data carrier is used in a control facility of a magnetic resonance facility, this is embodied to perform the method according to the disclosure.

BRIEF DESCRIPTION OF THE DRAWINGS

Further advantages and details of the present disclosure emerge from the exemplary aspects described in the following and with reference to the drawing. Herein, the drawings show:

FIG. 7 illustrates a magnetic resonance facility according to the disclosure, and FIG. 8 illustrates the functional structure of a control facility of the magnetic resonance facility.

DETAILED DESCRIPTION

Figure 1:
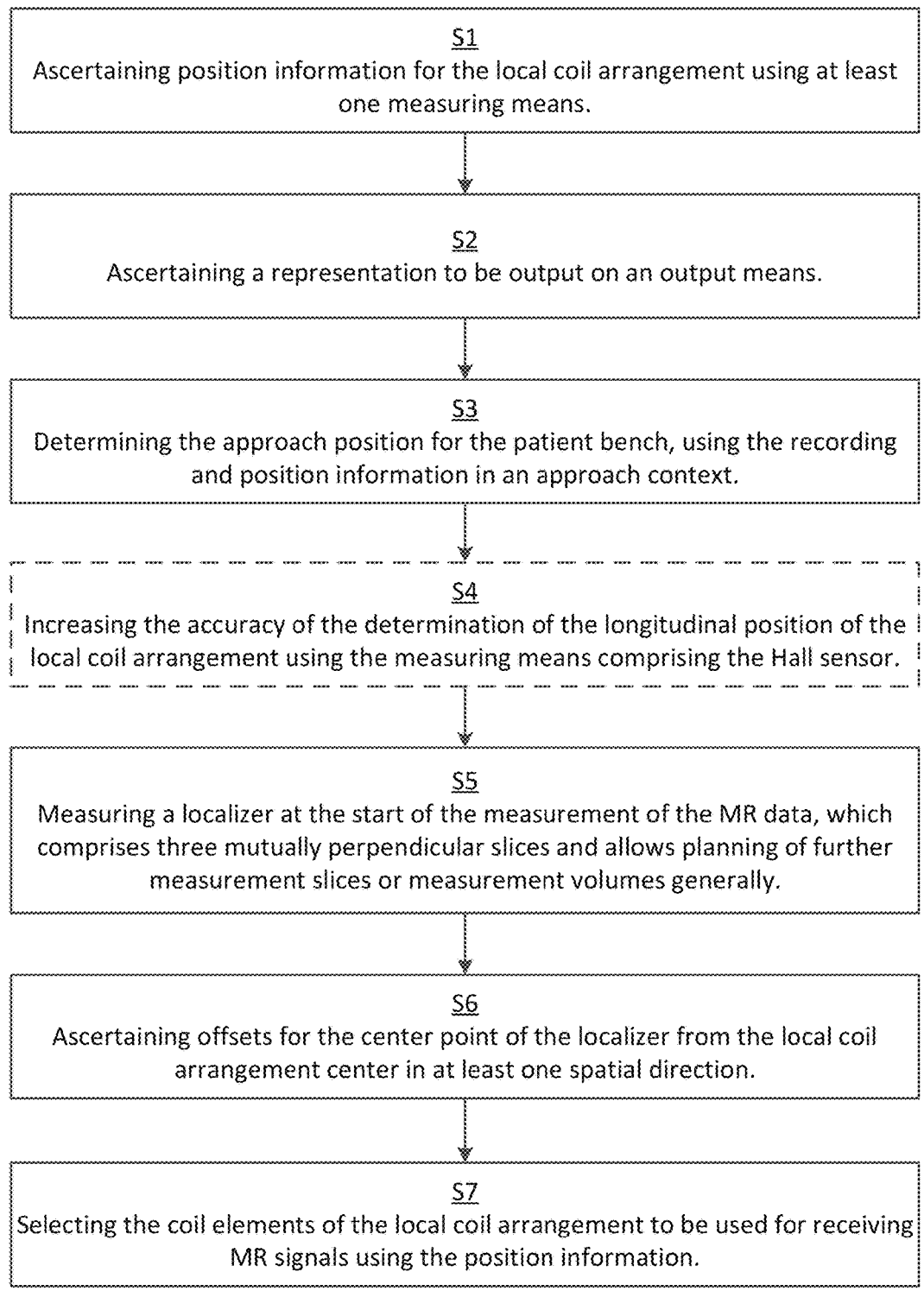
FIG. 1 illustrates a flow chart of an exemplary aspect of the method according to the disclosure.

FIG. 1 shows a flow chart of an exemplary aspect of the method according to the disclosure. Herein, a situation is assumed on a magnetic resonance facility with a cylindrical patient bore in which, when a patient bench is at least still partially located outside the patient bore, a patient is positioned on the patient bench and at least one local coil arrangement to be used in a measurement on the patient has already been positioned in the correct position on the patient bench and/or the patient. This means that the at least one local coil arrangement is freely positionable at least in the longitudinal direction of the patient bench, which also corresponds to the longitudinal direction of the patient bore and, hence, the Z-direction of the magnetic resonance facility. The horizontal direction perpendicular to the longitudinal direction is the X-direction, and the vertical direction perpendicular to the Z-direction is the Y-direction. In this situation, it is now necessary to select an approach position for the patient bench that is as optimal as possible for the measurement of the magnetic resonance data from a corresponding region of interest of the patient. Herein, the requirements placed on a user of the magnetic resonance facility, for example, a medical technical assistant operating the magnetic resonance facility, are to be kept as low as possible, and it is assumed that the at least one local coil arrangement is positioned in an advisable and relatively accurate manner on the patient and/or the patient bench so that it ultimately already contains a clear indication of where measurements are to be taken.

In the exemplary aspect depicted here, in step S1, first, using at least one measuring means, position information is ascertained for the local coil arrangement using at least one measuring means. Herein, in the present case, the position information comprises all three spatial coordinates and three orientation angles, in the present case a pitch angle, a roll angle, and a yaw angle, relating to the coordinate system of the magnetic resonance facility. This coordinate system of the magnetic resonance facility relates to the Z-axis in the longitudinal direction, the X-axis in the X-direction, and the Y-axis in the Y-direction and, in the present exemplary aspect, has its coordinate origin in the center, i.e., the center point, of the field of view, in the present case of the homogeneity volume of the main magnetic field of the magnetic resonance facility. In this case, the position information relates to the coordinate origin of the local coil coordinate system of the local coil arrangement, which, in the present case, coincides with the local coil arrangement center. The coordinates of the local coil coordinate system are denoted by (U, V).

In the present case, the measuring means used are at least one Hall sensor, which measures the main magnetic field strength, and one inclination sensor—these are installed in the local coil arrangement. This is explained in more detail by FIG. 2, which is a schematic sketch of a local coil arrangement 1 already positioned on a patient bench 2 and extending in the longitudinal direction 3 (Z-direction). The local coil arrangement 1 comprises a plurality of coil elements 4 arranged in a matrix-like manner, which form one or more local coils (subcoils). A coil cable 5 can be used to attach the local coil arrangement 1 to a slot 6 in the patient bench 2.

A Hall sensor 8 and an inclination sensor 9 are installed in the local coil arrangement 1 as measuring means 7. The three-dimensional Hall sensor 8 is embodied to ascertain position coordinates and orientation information based on the known profile of the main magnetic field strength, wherein remaining uncertainties can be clarified based on the inclination sensor 9, for example, uncertainties with respect to symmetries of the main magnetic field. With regard to the basic principle of the Hall sensor 8 and the assigned inclination sensor 9, reference is made to the aforementioned DE 10 2016 203 255 A1. It is evident that the Hall sensor 8 is not installed in the local coil arrangement center 10, which also serves as the coordinate origin of the local coil coordinate system 11, but is arranged offset. Hence, to provide position information relating to the local coil arrangement center 10, the offset 12 is taken into account accordingly; this can be done by the Hall sensor 8 itself or by a control facility of the magnetic resonance facility that performs the method.

In this context, it is noted that, as known in principle in the prior art, the local coil arrangement 1 can be identified by inserting the plug 13 into the slot 6. For example, a control file assigned to the local coil arrangement 1 and containing further coil information can be provided in a storage means of the control facility or be retrievable by the control facility. The coil information can, for example, describe the location of the coil elements 4 in the local coil coordinate system 11 and the location of the Hall sensor 8 in the local coil coordinate system 11 and therefore, the offset 12. The coil information can also contain the type of local coil arrangement 1 (for example, abdomen coil, phased-array coil from knee to chest, or the like) and the location of subcoils to be used as separate local coils.

In other exemplary aspects, it is alternatively or additionally also possible to use a 3D camera or a comparable device as a measuring means 7.

While it is in principle conceivable to specify recording information, for example, content stating that the local coil arrangement center 10 should be located in the center of the field of view for the measurement, or also to determine this automatically, for example, from workflow information for the measurement that is already available, it has been found to be expedient to take account of user input that can be requested on a reliable basis with the aid of the position information. Therefore, in a next step S2 (cf. FIG. 1), a representation to be output on an output means is ascertained, which shows the local coil arrangement 1 and possibly its subcoils formed by coil elements 4 in relation to the patient and to the patient bench 2, for which purpose, in the present case, a patient arrangement information and the already discussed coil information (with respect to the subcoils and their corresponding local coil center) are also used.

Figure 2:
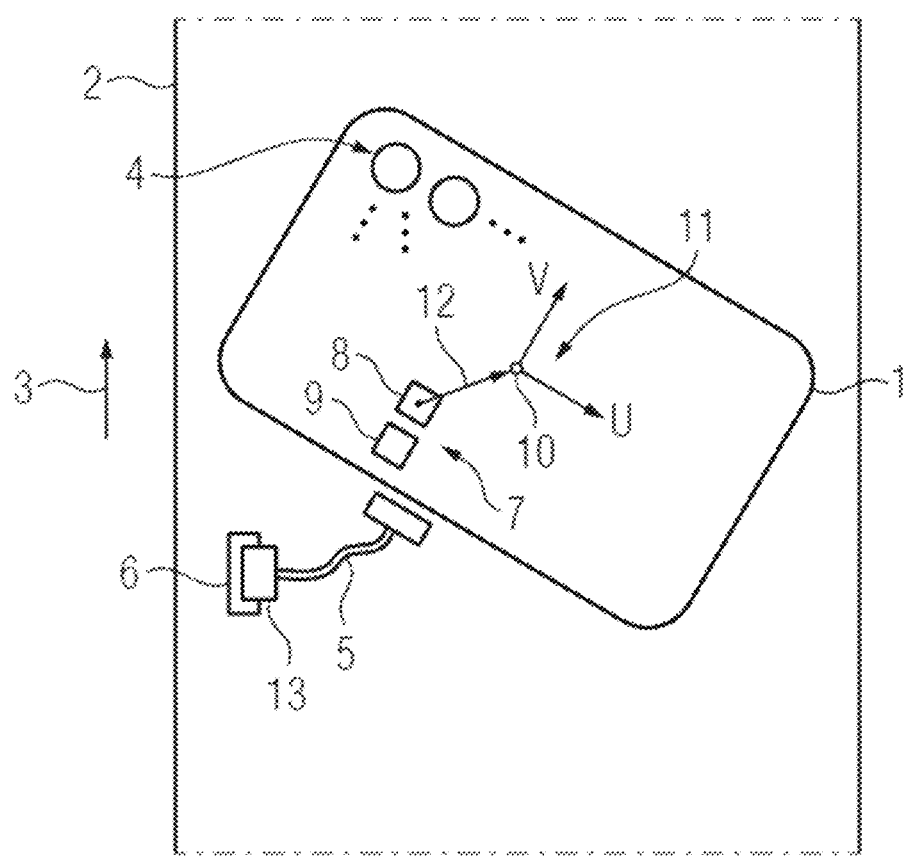
FIG. 2 illustrates a schematic sketch of a local coil arrangement with a Hall sensor installed therein.
Figure 3:
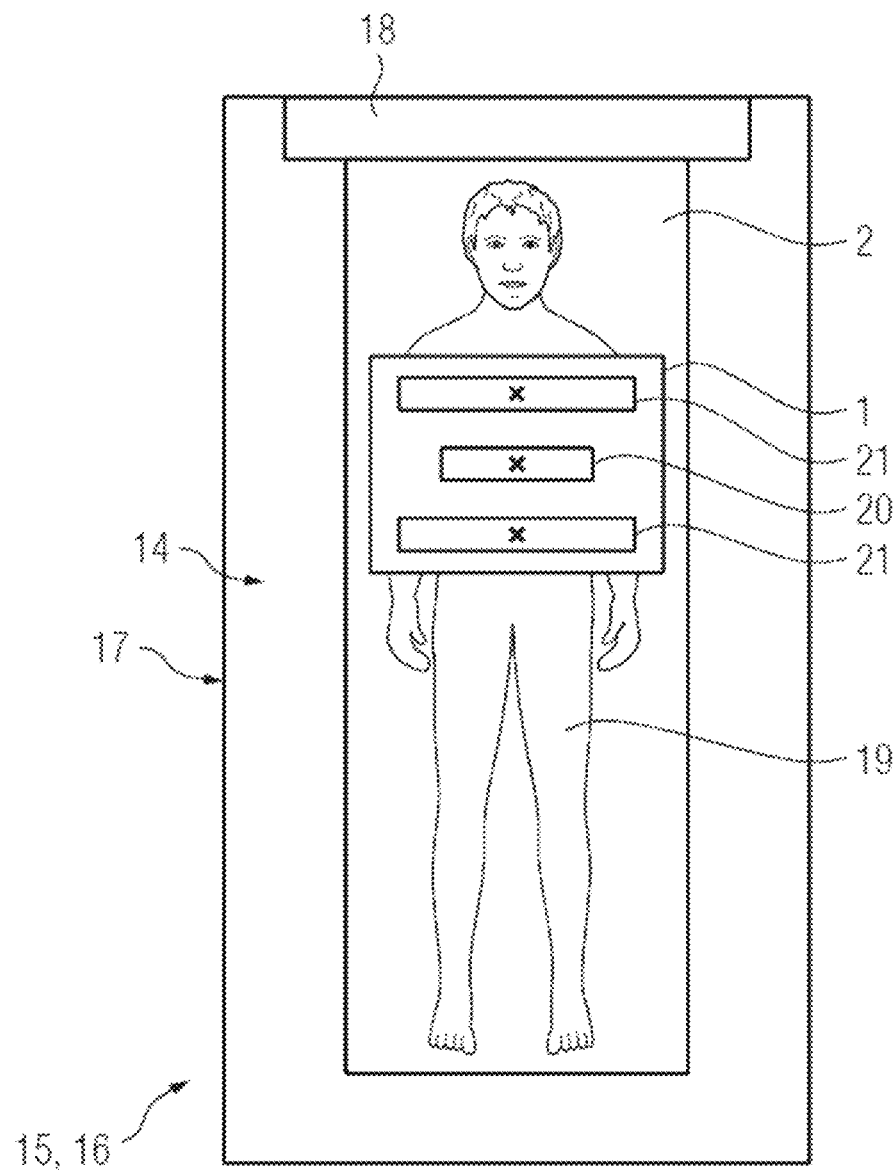
FIG. 3 illustrates a possible representation on a touchscreen.

The patient arrangement information ultimately describes the location of the patient on the patient bench 2 and can already be deduced with sufficient accuracy from patient information obtained during registration. Herein, advantage is taken of the fact that the patient bench can have predefined target positions or even mandatory positions for specific patient parts, in particular, the head and the heels. For example, it is usual to request that, with "head first" positioning, the head of the patient is placed on a special pillow for the head and/or within a permanently mounted head coil. Corresponding positions, for example, recesses, can also be used for the foot regions in the case of "feet first" positioning, a heel cushion and/or a suitable recess for placing the heels. Assuming correct positioning here, an acceptable estimation of information on the location of specific anatomical features or regions is obtained from the height, weight, and possibly the gender or age of the patient information. Since hence, acceptable patient arrangement information describing the location of the patient relative to the patient bench 2 and the position information describing the position of the local coil arrangement 1 relative to the patient bench 2 that is available via the current longitudinal position of the patient bench 2, which is present in the control facility or can be retrieved, are known, a representation 14 can be generated, for example, as shown in FIG. 2.

Here, a touchscreen 17 is used as output means 15 and input means 16 combined therewith, which is provided on the front side from which the patient bench 2 is moved into the main magnet unit, more precisely the patient bore, of the magnetic resonance facility. In addition to a schematic indication 18 of the main magnet unit, in the present case, the representation 14 obviously contains a schematic indication of the patient bench 2, the local coil arrangement 1, and the patient 19 according to the patient arrangement information. From the coil information, a button 20, which is indicated true-to-location, for the local coil arrangement center 10, as well as buttons 21 arranged true-to-location with respect to the respective local coil center for the selection of subcoils, have been added; the buttons 21 can obviously also be omitted if the local coil arrangement 1 only provides a single local coil.

By interacting with the buttons 20, 21, a user can now select whether the entire local coil arrangement 1 or one of its subcoils formed by coil elements 4 is to be used to measure the magnetic resonance data and placed accordingly in the center of the field of view. After possible confirmation, corresponding recording information (local coil center of a subcoil or local coil arrangement center 10 is to be placed in the center of the field of view). Herein, the buttons 20, 21 or the associated positioning instructions can be understood as proposals.

This approach relating to the local coil arrangement 1 and possibly its subcoils when ascertaining the recording information is preferred since here the position information, possibly together with the coil information, which describes the local coil center of a subcoil relative to the local coil arrangement center 10, can be at least substantially sufficient for defining the approach position for the patient bench 2 in a simple manner. In simple cases in which no longitudinal displacements, which will be discussed in more detail below, have to be taken into account, the approach position results from the offset of the local coil arrangement center 10 or the local coil center of a selected subcoil in the longitudinal direction 3 toward the center of the field of view. If, as is usual, the longitudinal position or, specifically, longitudinal coordinate in the magnetic resonance facility coordinate system is in any case related to the coordinate origin in the center of the field of view, in such simple cases, when selecting the local coil arrangement center 10, the required displacement distance and hence approach position can ultimately be simply read off as the longitudinal position of the local coil arrangement 1 from the position information, following the instruction of the recording information.

However, exemplary aspects are also conceivable in which a reference to the anatomy of the patient 19 can be derived by interaction with the representation 14. For example, it can be selected via the representation 14 that the center of an anatomical region, for example, the abdomen, and/or an anatomical feature, for example, an organ such as the heart, kidney, lung, and the like, is to be placed in the longitudinal direction in the center of the field of view, wherein then it is expediently also possible to derive a corresponding longitudinal displacement.

In addition, at this point, reference is made once again to the fact that it is not mandatory to work with a representation 14, but this is preferable to provide flexibility for the user. In particular, for example, when using a single local coil arrangement 1 with only one single local coil, it can also be automatically assumed that this is placed with respect to the desired region of interest of the patient 19 in such a way that the local coil arrangement center 10 is to be placed in the center of the field of view for optimal measuring conditions of the magnetic resonance data. When there is an option to choose between local coil arrangements 1 or subcoils, it is also possible for further available workflow information to indicate which one should be placed in the center of the field of view for the subsequent measurement step. This can also be offered as a proposal to be confirmed in the representation 14. An actual selection can then, for example, be limited to cases in which it is actually unclear which local coil or local coil arrangement 1 is to be used.

Furthermore, reference is made to the fact that obviously other operating elements, information, and the like can be displayed on the touchscreen 17 with the representation 14.

For example, it is conceivable, in particular, when ascertaining the six-dimensional pose of the local coil arrangement 1, also to determine workflow information automatically and output it for confirmation in the representation 14. Thus, an arrangement of the local coil arrangement with respect to the X-direction (horizontal transverse direction) can be used to infer the desired laterality (for example, left lung, right lung, or both if positioned centrally).

The recording information and the position information, possibly additionally using the coil information and/or workflow information and/or patient information, are used in an approach context to determine the approach position for the patient bench 2 in step S3 (cf. FIG. 1). The approach context can, for example, comprise a look-up table stored in a storage means of the control facility, but can also be implemented at least partially elsewhere, for example, using a trained artificial intelligence approach function and/or other mathematical (formula) relationships.

In the present case, to ascertain the approach position, it is, in principle assumed that the local coil arrangement center 10 is to be placed in the center of the field of view. In other words, if the coordinate systems are selected as described above, the longitudinal position of the local coil arrangement 1 could already define the required displacement distance in a simple manner. The approach context now determines a longitudinal displacement to be applied to this basic value; in the simplest case, this is zero. If a specific subcoil was selected, the corresponding longitudinal displacement (of the associated local coil center relative to the local coil arrangement center 10) simply results from the coil information. These variants are based on the assumption that an experienced user optimally positions the local coil arrangement 1 for the envisaged workflow, for example, a recording protocol, so that the local coil center or local coil arrangement center 10 is placed with the envisaged center of the field of view. This case is intuitive and, therefore, easy to implement for all users.

However, workflows are also conceivable in that there may be other reasons for longitudinal displacements from the basic value, which can be taken into account accordingly via the approach context, in particular, communicated as workflow information. An exemplary case for such a necessary additional longitudinal displacement always arises when positioning of the local coil arrangement center 10 or local coil center of the subcoil exactly over the envisaged region of interest of the patient 19 is not possible. Still, this envisaged region of interest is to be placed in the center of the field of view. This can then be the case if a plurality of local coil arrangements 1 are used, for example, in the case of two local coil arrangements 1 to be placed on the patient in the torso region, one over the abdomen, the second on the rib cage. Herein, the second local coil arrangement 1 can be provided for a heart measurement. The position information and the coil information are known for both local coil arrangements 1. If the anatomical feature 'heart' or the second local coil arrangement 1 is now selected to ascertain the recording information, it may be the case that, due to the reason that the local coil arrangements 1 cannot be placed in an overlapping manner, the second local coil arrangement 1 is not placed exactly over the heart (in the longitudinal direction 3). Empirical values show that a longitudinal displacement of 5 cm relative to the heart results. The approach context then provides this longitudinal displacement for the determination of the approach position. The use of machine learning to ascertain at least part of the approach context can, in particular, be expedient for mapping such empirical values in specific situations.

Step S4, which now follows in FIG. 1, is optional and relates to increasing the accuracy of the determination of the longitudinal position of the local coil arrangement 1 using the measuring means 7 comprising the Hall sensor 8. Herein, advantage is taken of the fact that an optimal measuring point ("sweet spot") exists in the main magnetic field of the magnetic resonance facility at which the measured value of the main magnetic field strength, which can be stored in the control facility as a threshold value, in particular, together with its longitudinal position relative to the center of the field of view, varies only extremely slightly with the X-position and the Y-position, in particular, varies minimally. This allows an extremely accurate determination of the longitudinal position, i.e., the Z-coordinate. For example, it is possible to achieve an accuracy of less than 3 mm. Therefore, it is proposed for step S4 that when the patient bench 2 is moved into the patient bore, wherein the local coil arrangement 1 is moved through the optimal measuring point, this is localized, and the now more accurate measurement is used to determine the approach position more accurately, i.e., to correct it with respect to the previous determination.

Figure 4:
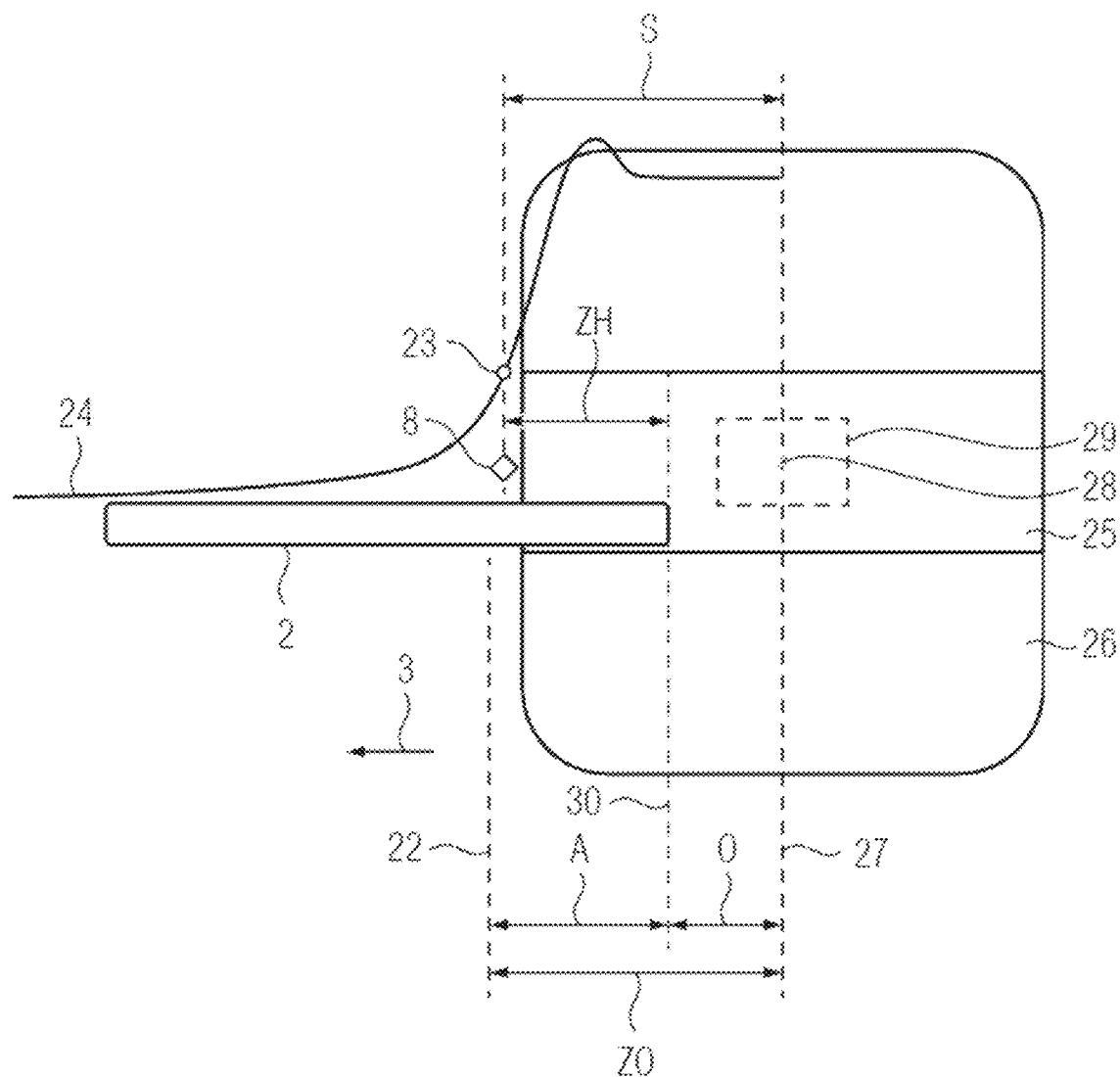
FIG. 4 illustrates a schematic sketch of a patient bench entering a patient bore.

This situation is explained in more detail by the representation in FIG. 4, which is a schematic illustration of the moment at which, when the patient bench 2 is moved from a start position 22 into an end position, the Hall sensor 8 is located at the optimal measuring point 23, which is indicated in a magnitude curve 24 of the main magnetic field strength. Usually, this optimal measuring point 23 is located shortly before entering the patient bore 25 of the main magnet unit 26. Here, by way of example, the end position 27 is shown as the center of the field of view 28 of the field of view 29 of the magnetic resonance facility, wherein the longitudinal position of the patient bench 2 in the longitudinal direction 3 that is available in the control facility or can be called up relates to the front edge 30 of the patient bench 2. If it is now known where the Hall sensor 8 is located when it passes through the optimal measuring point 23 relative to the center of the field of view 28 (distance S) and at the same time the longitudinal position of the front edge of the patient bench 2 relative to the center of the field of view 28 at this time (distance O) is also known, the longitudinal distance ZH between the Hall sensor 8 and the front edge 30 of the patient bench 2 (and, with the known arrangement of the Hall sensor 8 in the local coil arrangement 1, also the longitudinal position of the local coil arrangement 1 relative to the front edge 30 of the patient bench 2) is easily obtained from ZH=S–O. Since the longitudinal position of the patient bench 2 was already known when ascertaining the position information in step S1, the corresponding relative longitudinal positions can, for example, be compared to derive a correction; on the other hand, correction is also possible by directly applying the new more accurately measured longitudinal position of the local coil arrangement 1.

By the skillful choice of the end position 27 as the center of the field of view 28 here, for the final approach of the more accurately ascertained approach position, it is even possible simply to use the highly accurately ascertained relative longitudinal position of the local coil arrangement 1 on the patient table 2 as the basic value, in addition, it may be necessary to add the longitudinal displacement, if different from zero. Evidently, different specific possibilities for increasing accuracy when approaching the approach position are possible and can be used in the method presented here.

Figure 5:
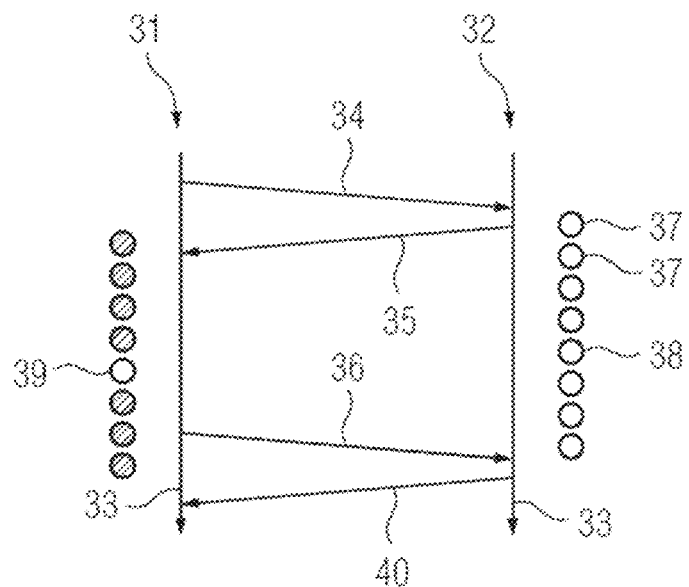
FIG. 5 illustrates a representation explaining time synchronization for localizing an optimal measuring point.

If there is a high-speed data link, for example, an optical fiber and/or an infrared connection, between the control facility and the Hall sensor 8, it is, in principle conceivable, to find in real time the longitudinal position of the patient bench 2 assigned to the passage of the optimal measuring point 23. However, in the present case, it is assumed that there is a slower data link, for example, an I2C bus from the control facility to the local coil arrangement 1 and thus the Hall sensor 8. It is then proposed that longitudinal direction synchronization be established between the patient bench 2 and the Hall sensor 8 over time. For this purpose, it is proposed that at the start of the movement of the patient bench 2 from the start position 22 into the end position 27, the Hall sensor is switched to a localization mode, which is accordingly deactivated again when the patient bench 2 stops at the end point 27. In localization mode, the Hall sensor 8 does not transmit any data but only measures the main magnetic field and compares it with the threshold value for the corresponding magnetic resonance facility, i.e., the main magnetic field that can be measured at the optimal measuring point (see also magnitude curve 24). Herein, the main magnetic field measurements take place in time steps, for example, 30 measurements per second. The time step can correspond to the internal ticks of a microcontroller of the Hall sensor 8. If the threshold value is exceeded for the first time during a measurement in a time step, the time step is stored together with the measured value of the main magnetic field at this time step in a memory of the microcontroller as a threshold value time. The start time and end time of the localization mode are also stored in microcontroller ticks. This and the synchronization over time are explained in more detail in FIG. 5.

Herein, the left side 31 relates to the control facility, the right side 32 to the Hall sensor 8, wherein the arrows 33 running from top to bottom in each case symbolize the time lapse for the control facility, for example, in seconds/absolute, for the Hall sensor in ticks of the microcontroller. The arrow 34 symbolizes a control signal for starting the localization mode from the control facility to the Hall sensor 8. This confirms the start of the localization mode according to the arrow 35. The arrow 36 symbolizes the control signal for stopping the localization mode. During the active localization mode, measurements are taken at time steps 37 symbolized by dots until the threshold value is exceeded in a time step 38, i.e., the optimal measuring point 23 has been passed. The task is now to find the corresponding time and the assigned longitudinal position of the patient bench 2 as the threshold value position of the patient bench, indicated here by way of example as a dot 39.

It is now possible for a total time in ticks of the microcontroller to be ascertained for the Hall sensor 8 from the start time and end time. A quantity proportional to the threshold value time of the time step 38 can be ascertained as the ratio of the time until time step 38 in ticks and the total duration in ticks. Since the ticks are found in the numerator and denominator, the ratio is dimensionless and is always in the interval [0 . . . 1]. This ratio parameter is sent as a response from the Hall sensor 8 to the control facility of the magnetic resonance facility according to the arrow 40.

Now, when applied to the total time measured by the control facility, the ratio makes it possible to determine the time 39 on the control facility. If the longitudinal position of the patient table was also logged there, for example, also, with 30 queries per second, the longitudinal position of the patient table 2 assigned to time step 38 can be ascertained directly from this range of movement of the patient table 2 as the longitudinal position of the patient bench 2 assigned to the time 39 corresponding to the threshold value time as the threshold value position in the movement sequence.

However, it can already be sufficient to know only the start position 22 and the end position 27, since then the associated longitudinal position of the patient bench can be ascertained using the known constant longitudinal speed of the patient bench 2 via the ratio.

Figure 6:
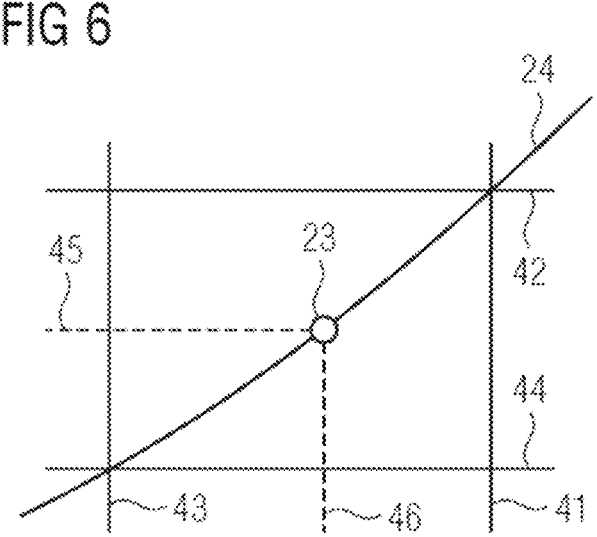
FIG. 6 illustrates a sketch for interpolation with respect to the optimal measuring point.

In this context, it is also noted that for the greatest possible accuracy, since the threshold value and hence the optimal measuring point 23 is usually not met exactly at time step 38, the longitudinal position is ascertained exactly in the usual way provided in the Hall sensor 8. It is also possible to interpolate when more exactly the optimal measuring point 23 was passed, cf. FIG. 6, where the magnitude profile 24 is shown again with the measuring grid for the time step 38 and the preceding time step 37, namely the ascertained longitudinal position 41 and the magnitude 42 of the main magnetic field at time step 38 and the ascertained longitudinal position 43 and the measured magnitude 44 of the main magnetic field at time step 37 immediately preceding time step 38. Furthermore, this shows the location of the threshold value 45. By interpolation, its longitudinal position 46 can then be interpolated with a high degree of accuracy and compared with the stored value for the optimal measuring point 23 or, alternatively, a corresponding fraction between time step 38 and the immediately preceding time step 37 can be used as the threshold value time when determining the ratio.

In step S5, the optionally more exactly determined approach position is then approached.

However, the position information can optionally also be further used during the measurement of the magnetic resonance data or for setting measurement parameters of the measurement of the magnetic resonance data.

In step S5, initially, a localizer is then measured at the start of the measurement of the magnetic resonance data, which comprises three mutually perpendicular slices and allows planning of further measurement slices or measurement volumes generally. Usually, the three orthogonal slices intersect in the center of the field of view 28. However, it may also be the case that, for some workflows, in particular, recording programs, in particular, in the case of off-center measurements (for example, of the shoulders or knee), another location of the localizer may be expedient. For example, offsets may then be required for the center point of the localizer. Since, in the present case, using the measuring means 7, in particular, the use of the inclination sensor 9, the position information relates to all six degrees of freedom of the local coil arrangement position, namely X-coordinate, Y-coordinate, Z-coordinate, yaw angle, roll angle, and pitch angle, it can also be used to automatically change the position of the center point of the localizer such that the user does not have to correct it manually. The measurement of the magnetic resonance data can take place more quickly. In principle, the local coil arrangement center 10, possibly modified by the longitudinal displacement, can also be used for the center point of the localizer. If, however, off-center information is available indicating that the measurement is an off-center measurement, depending on the workflow, in step S6, it may be possible using an offset context to ascertain offsets for the center point of the localizer from the local coil arrangement center 10 in at least one spatial direction, for example, for the X-direction, the Y-direction and the Z-direction (longitudinal direction 3). Herein, this assumes the current local coil arrangement center 10 at the approach position.

In step S7, the position information can also be used to select the coil elements of the local coil arrangement to be used for receiving magnetic resonance signals. Here, preferably, the coil elements selected are those located in the field of view 29, which do not overlap with another coil element in one of the main directions. For example, checking for overlaps in the X-, Y-, and Z-directions is possible. In this way, the position information also enables image quality to be optimized.

FIG. 7 shows a schematic sketch of a magnetic resonance facility 47 according to the disclosure. As known in principle, this comprises the main magnet unit 26 in which a main magnet 48, particularly a superconducting main magnet, is installed to generate the main magnetic field. The main magnet unit defines the cylindrical patient bore 25 and, due to the homogeneity of the main magnetic field, the field of view 29 with the center of the field of view 28, which in the present case coincides with the center of the patient bore 25. The patient bore 25 can also be provided with a radio-frequency coil arrangement 49 (body coil) and a gradient coil arrangement 50 with gradient coils for the X-, Y-, and Z-directions. The magnetic resonance facility 47 furthermore comprises the patient bench 2 and the at least one local coil arrangement 1. The operation of the magnetic resonance facility 47 is controlled by the aforementioned control facility 51. This also communicates with the output means 15 and input means 16, particularly implemented as the touchscreen 17. The magnetic resonance facility 47 can also comprise further components not shown in further detail here, for example, a cooling facility, gradient amplifiers, and the like.

The control facility 51 is embodied to perform the method according to the disclosure. To this end, FIG. 8 shows the functional structure of the control facility 51 in more detail. This first comprises a storage means 52 in which, for example, the approach context with the displacement context integrated therein, and optionally, the offset context can be stored. For example, said contexts can be provided as a common large look-up table; however, they can also comprise trained functions and the like.

As known in principle, the control facility 51 furthermore comprises a sequencing unit 53, which controls the recording operation, i.e., measuring operation for magnetic resonance data, of the magnetic resonance facility 47. In the present case, the sequencing unit 53 is also embodied to perform steps S6 and S7 according to FIG. 1. To implement the method according to the disclosure, the control facility 51 furthermore comprises a measuring unit 54 for actuating the measuring means 7, in particular, the Hall sensor 8, so that the measuring unit 54 can also be used to ascertain the position information (step S1). In an ascertaining unit 55, the recording information can be ascertained according to step S2 and step S3. An optional correction unit 56 is embodied to perform step S4, i.e., to increase the accuracy of the approach position based on the optimal measuring point 23. A positioning unit 57 is embodied to automatically ascertain the approach position from the position information and the recording position using the approach context. Then, it transfers this approach position to a bench control unit 58, which performs the general actuation of the patient bench 2. In other words, the positioning unit 57 and the bench control unit 58 are jointly embodied to perform step S5.

In the present case, to handle the output of the representation 14 and user inputs, a representation unit 59 is provided which can generate the representation 14 and can also generally serve as an input-output control unit.

Although the disclosure was illustrated and described in more detail by the preferred exemplary aspect, the disclosure is not restricted by the disclosed examples, and other variations can be derived herefrom by the person skilled in the art without departing from the scope of protection of the disclosed aspects.

The invention claimed is:

1. A computer-implemented method for operating a magnetic resonance facility having a main magnet unit with a patient bore, wherein a field of view of the magnetic resonance facility, which is defined by a homogeneity of a main magnetic field generated by a main magnet of the main magnet unit, lies within the patient bore, and a patient bench to position the patient in the patient bore is movable along a longitudinal direction of the patient bench, wherein at least one local coil arrangement with at least one coil element to measure magnetic resonance data is freely positionable on the patient bench and/or a patient to be measured at least with respect to the longitudinal direction, the method comprising:

ascertaining, via a measuring device when the patient bench is at least partially located outside the patient bore and after positioning of the local coil arrangement, position information describing a position of the local coil arrangement on the patient bench at least in the longitudinal direction by (i) upon movement of the patient bench, causing the measuring device to operate in a localization mode in which the measuring device measures the main magnetic field without transmitting data, (ii) upon the patient bench stopping, causing the measuring device to terminate operation in the localization mode to transmit data indicative of a threshold value time comprising a time during the movement of the patient bench at which a measurement of the magnetic field exceeded a prespecified threshold value, and (iii) determining the position information based upon the threshold value time;
ascertaining recording information describing the positioning of the local coil arrangement with respect to the field of view of the magnetic resonance facility; and
automatically positioning the patient bench in the longitudinal direction at an approach position ascertained from the position information and the recording information.

2. The method as claimed in claim 1, wherein the measuring device is a magnetic field sensor installed in the local coil arrangement and/or a 3D camera.

3. The method as claimed in claim 1, wherein the recording information is ascertained at least partially describing a positioning of a center of the local coil arrangement and/or a coordinate origin of a local coil coordinate system and/or at least one of the at least one coil element with respect to the field of view.

4. The method as claimed in claim 3, wherein the local coil arrangement is from among a plurality of local coil arrangements, and
wherein, when using the plurality of local coil arrangements to be arranged adjacent to one another on the patient in a non-overlapping manner, a longitudinal displacement to be used for the approach position is ascertained based on coil information, which is obtained with respect to the plurality of local coil arrangements, using a displacement context by which the local coil arrangement is displaced in the longitudinal direction from a predetermined position due to an additional arrangement of a further local coil arrangement of the plurality of local coil arrangements.

5. The method as claimed in claim 1, further comprising:
ascertaining or providing patient arrangement information with respect to the patient bench,
wherein a representation of a relative positioning of the patient and the local coil arrangement and/or at least one coil element of the local coil arrangement is generated from the patient arrangement information and the position information and is output on an output device, and the recording information is at least partially ascertained from user input related to the representation.

6. The method as claimed in claim 5, wherein the representation comprises at least one current proposal for the recording information and the user input relates to a confirmation or rejection of at least one of the at least one current proposal.

7. The method as claimed in claim 5, wherein the output device is a touchscreen, and the user input is ascertained comprising user interaction with the representation on the touchscreen.

8. The method as claimed in claim 1, wherein the measuring device comprises a Hall sensor, and further comprising:
at the approach position, localizing a previously known measuring point in the longitudinal direction while the patient bench is being moved into the patient bore in which sensor data from the Hall sensor is at least dependent on the position of the Hall sensor perpendicular to the longitudinal direction, and a result of the localization is used to correct the position information and/or the approach position.

9. The method as claimed in claim 1, wherein operation of the measuring device in the localization mode comprises, for each of a plurality of time steps, measuring the main magnetic field and comparing the measured main magnetic field with the prespecified threshold value for the main magnetic field,
the threshold value time is stored,
upon the patient bench stopping, a total time of the localization mode is stored, and
a result of the localization is ascertained from the threshold value time and the total time of the localization mode.

10. The method as claimed in claim 9, wherein the threshold value time is stored as a time step number since activation at which the threshold value is exceeded.

11. The method as claimed in claim 9, wherein the localization mode is terminated and the total time of the localization mode is stored as a number of time steps.

12. The method as claimed in claim 1, wherein the measuring device ascertains a complete three-dimensional position and/or a complete three-dimensional orientation of the local coil arrangement as position information.

13. The method as claimed in claim 12, wherein, to record a localizer at a start of measuring the magnetic resonance data, a center point of the localizer is placed on a current local coil arrangement center or, in dependence on off-center information relating to a following measurement of the magnetic resonance data and describing a distance of a region of interest of the patient from the center of the field of view, an offset context is used to ascertain an offset for the center point of the localizer from the local coil arrangement center in at least one spatial direction.

14. The method as claimed in claim 12, wherein a six-dimensional pose of the local coil arrangement is used to select coil elements to be used for measuring the magnetic resonance data, and non-overlapping coil elements lying in the field of view and/or in physical gradient axes and/or logical gradient axes of the magnetic resonance facility are selected to measure the magnetic resonance data.

15. The method as claimed in claim 2, wherein the magnetic field sensor is a Hall sensor.

16. The method as claimed in claim 1, wherein the field of view is a center of the field of view.

17. The method as claimed in claim 1, wherein the at least one coil element comprises subcoils.

18. A magnetic resonance facility having a control facility and a main magnet unit with a patient bore, wherein a field of view of the magnetic resonance facility, which is defined by a homogeneity of a main magnetic field generated by a main magnet of the main magnet unit, lies within the patient bore, and a patient bench to position the patient in the patient bore is movable along a longitudinal direction of the patient bench, wherein the magnetic resonance facility further has at least one local coil arrangement with at least one coil element to measure magnetic resonance data, which is freely positionable on the patient bench and/or a patient to be measured at least with respect to the longitudinal direction, and has a measuring device to capture the position of the local coil arrangement positioned for the measurement at least in the longitudinal direction, wherein the control facility comprises:
a measuring unit operable to ascertain position information of the local coil arrangement with the measuring device when the patient bench is at least partially located outside the patient bore by (i) upon movement of the patient bench, causing the measuring device to operate in a localization mode in which the measuring device measures the main magnetic field without transmitting data, (ii) upon the patient bench stopping, causing the measuring device to terminate operation in the localization mode to transmit data indicative of a threshold value time comprising a time during the movement of the patient bench at which a measurement of the magnetic field exceeded a prespecified threshold value, and (iii) determining the position information based upon the threshold value time, wherein the position information describes a position of the local coil arrangement on the patient bench at least in the longitudinal direction;

an ascertaining unit operable to ascertain recording information describing positioning of the local coil arrangement with respect to the field of view of the magnetic resonance facility; and a positioning unit configured to automatically position the patient bench in the longitudinal direction at an approach position ascertained from the position information and the recording information.

19. The magnetic resonance facility of claim 18, wherein the patient bore is a cylindrical patient bore.

20. A non-transitory electronically readable data carrier including a computer program, that when executed on a control facility of a magnetic resonance facility having a main magnet unit with a patient bore, wherein a field of view of the magnetic resonance facility, which is defined by a homogeneity of a main magnetic field generated by a main magnet of the main magnet unit, lies within the patient bore, and a patient bench to position the patient in the patient bore is movable along a longitudinal direction of the patient bench, wherein at least one local coil arrangement with at least one coil element to measure magnetic resonance data is freely positionable on the patient bench and/or a patient to be measured at least with respect to the longitudinal direction, cause the control facility to:

ascertain, via a measuring device when the patient bench is at least partially located outside the patient bore and after positioning of the local coil arrangement, position information describing a position of the local coil arrangement on the patient bench at least in the longitudinal direction by (i) upon movement of the patient bench, causing the measuring device to operate in a localization mode in which the measuring device measures the main magnetic field without transmitting data, (ii) upon the patient bench stopping, causing the measuring device to terminate operation in the localization mode to transmit data indicative of a threshold value time comprising a time during the movement of the patient bench at which a measurement of the magnetic field exceeded a prespecified threshold value, and (iii) determining the position information based upon the threshold value time;

ascertain recording information describing the positioning of the local coil arrangement with respect to the field of view of the magnetic resonance facility; and automatically position the patient bench in the longitudinal direction at an approach position ascertained from the position information and the recording information.

* * * * *